United States Patent Office 3,406,535
Patented Oct. 22, 1968

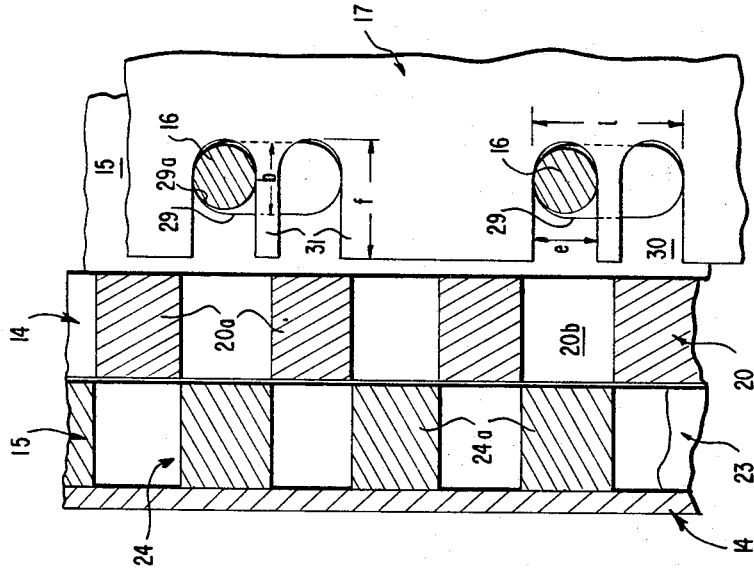
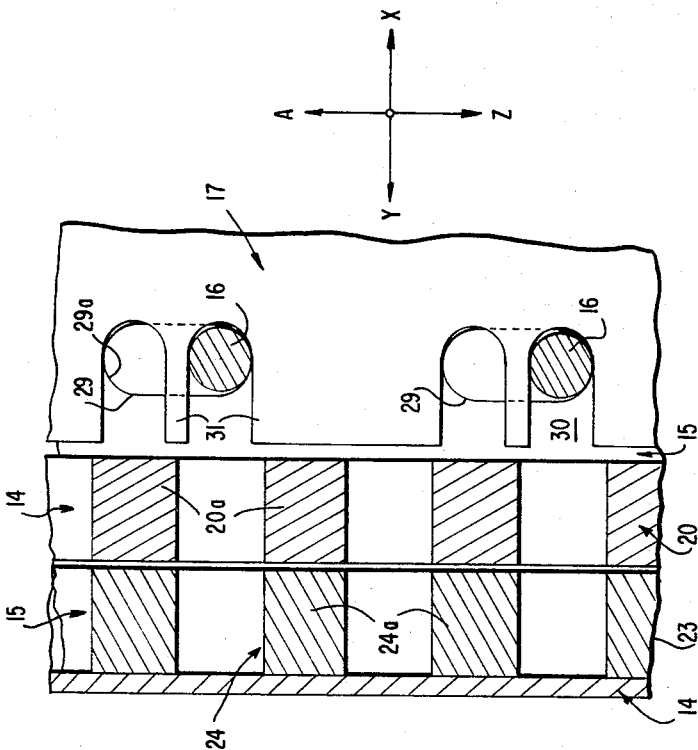
INVENTOR
RUDOLF SUDEROW

3,406,535
COUPLING BETWEEN THE SHAFT OF THE COMPRESSOR DRIVE TURBINE AND THE COMPRESSOR SHAFT OF GAS TURBINE DRIVE UNITS
Rudolf Suderow, deceased, late of Stuttgart-Degerloch, Germany, by Käthe Suderow, Sigrun Suderow, and Birgit Suderow, Stuttgart-Degerloch, Germany, sole heirs, assignors to Daimler-Benz Aktiengesellschaft, Stuttgart-Unterturkheim, Germany
Filed June 27, 1966, Ser. No. 561,320
Claims priority, application Germany, July 1, 1965, D 47,625
34 Claims. (Cl. 64—9)

ABSTRACT OF THE DISCLOSURE

A coupling arrangement, especially for use in gas turbine drive units, wherein the turbine drive shaft and the compressor shaft are releasably coupled by means of a form-locking connection which provides for transmission of driving torque in the circumferential direction and for absorption of thrust in the axial direction, while allowing for angular movement of one shaft with respect to the other while in the coupled condition. The coupling, according to the present invention, can be actuated, i.e., engaged or disengaged, by manipulation of an assembly key or wrench positioned within the turbine drive shaft, thereby obviating disassembly of the combustion chamber to effect coupling actuation. The present invention further contemplates that the assembly key or wrench might be in the form of a shaft of an output or load turbine, where such second turbine is employed, said shaft being disposed coaxially within the hollow turbine drive shaft. Further, the output or load turbine shaft may itself be of hollow construction, thus permitting the operating media to be conducted therethrough.

The present invention relates to a coupling between the shaft of the compressor-drive-turbine (compressor-drive-turbine-shaft) and the compressor-shaft of gas turbine drive units, having mutual centering means and a mutual arrangement of the two aforementioned shafts angularly moveable relative to each other within slight limits, which in the coupled or engaged condition are form-lockingly connected with each other in the circumferential direction for the transmission of the driving torque and in the axial direction for the absorption of the axial thrust.

It is known with gas turbine drive units to couple the rear end of the compressor shaft with the forward end the compressor-drive-turbine-shaft by way of a central tial direction by way of a splined connection and to establish the axial connection between the compressor or the compressor shaft and the compressor-drive-turbines or the compressor-drive-turbine-shaft by way of a central tie rod, whose forward end is threadably connected with the rear end of the compressor or the compressor shaft and whose rear end is threadably connected to the rear of the compressor-drive-turbines with the rear shaft section thereof. This measure is necessary for reasons of transmitting the turbine thrust acting rearwardly in the axial direction to the compressor shaft which is supported by way of a forward and rearward roller bearing, of which one, for the most part the forward bearing is constructed as fixed bearing whereas the one and only bearing of the compressor-drive-turbine-shaft, which is disposed for the most part to the rear of the compressor-drive-turbines, is constructed as loose bearing for reasons of the occurring strong thermal expansions, which loose bearing is not capable of absorbing the turbine thrust and transmit the same to the engine housing. The compressor-drive-turbine-shaft is customarily supported forwardly thereof within the compressor shaft at the height of the rearward compressor-bearing so that the entire rotor of the gas turbine drive unit rotates on three bearings.

The disadvantage of this known prior art construction resides in the forward and rearward threaded connection of the tie-rod which is sensitive to shaft displacements and offsets, even if occurring only within small limits, which displacements and offsets cannot be avoided by reason of the high pressures and thermal expansions existing within the drive unit. Moreover, the continuous or uninterrupted one-piece tie-rod is a relatively heavy additional structural part.

It is furthermore known in the prior art to compose the compressor-drive-turbine-shaft of several parts which are threadably connected with each other by flanged connections, whereby the shaft part adjacent the compressor shaft end carries external teeth that engage with the internal teeth of a coupling piece which, in turn, is non-rotatably connected by means of entrainment teeth with the end of the compressor-shaft so as to rotate in unison therewith. The form-locking connection between the compressor-shaft and the compressor-drive-turbine-shaft in the axial direction takes place thereby by means of a shorter central tie-rod whose forward end is threadably connected with the compressor-shaft and whose rear end is threadably connected with the forward sectional part of the compressor-drive-turbine-shaft. Even though this construction is more favorable from a weight point of view, it is beset in addition to the disadvantages which threaded connections inherently entail as such, with the shortcoming that the central space cannot be utilized at all or can be utilized only in a constructively complicated manner as passage space for lines and pipes for the conduction of operating media such as lubricating oil and bearing blocking air.

Furthermore, it is also known in the prior art to simply thread the forward end of the compressor-drive-turbine-shaft into the rear end of the compressor-shaft and to realize the torque transmission between the two aforementioned shafts by means of a coupling sleeve by way of an entrainment tooth system. However, with this type of construction, the threaded connection is particularly and directly endangered for the absorption of the turbine thrust forces acting in the axial direction toward the rear during any occurring shaft displacements and offsets by reason of the long lever arm, i.e. the large distance between the threader connection and compressor-drive-turbines.

Additionally, it is known in the prior art to extend the compressor-drive-turbine-shaft on the turbine side through the hollow compressor shaft, to center the compressor-drive-turbine-shaft within the hollow compressor shaft and to suspend the compressor-drive-turbine-shaft at the forward end of the compressor shaft by way of an abutment disk which absorbs the axial turbine thrust and is supported at the compressor shaft. The shortcoming and drawback of this construction resides in the fact that the assembly of the aforementioned axial connection between the compressor-shaft and the compressor-drive-turbine-shaft can be undertaken only from the side of the compressor. This, however, is possible only with few types of drive units, and more particularly only with such drive units which are accessible at the forward end thereof, i.e., in which no auxiliary aggregates and no auxiliary drive means are provided at the forward end thereof. This latter type of prior art construction, however, is not realizable at all with propeller drive units having a forwardly extending shaft for the drive of a forwardly arranged reduction-gear for the propeller.

The present invention aims at avoiding the disadvantages of the known constructions and at creating between the compressor-shaft and the shaft of the compressor-drive-turbines a coupling which can be actuated from the side of the turbine, i.e., which, without requiring disassembly of the combustion chamber system, permits the assembly and disassembly of the completely assembled turbine rotor or rotors consisting of turbine wheels and turbine shafts. Furthermore, it is an aim of the present invention to keep the coupling insensitive with respect to slight shaft displacements and additionally to so construct the same that in order to keep free a central passage within the rotor shafts for the accommodation of operating media lines, threaded connections for the form-locking absorption of the thrust forces in the axial direction and central tie-rods are avoided.

As solution to the underlying problem the present invention proposes as coupling for the form-locking connection of the compressor-drive-turbine-shaft with the compressor-shaft in the axial direction a rotary locking mechanism adapted to be actuated from the turbine side.

With a gas turbine drive unit having an output turbine mechanically separate from the compressor-drive-turbine, which drives a forwardly extending shaft (an output shaft) disposed coaxially within the compressor-drive-turbine-shaft, the output shaft serves according to the present invention for the actuation of the moveable parts of the rotary locking mechanism of the present invention.

In the actual construction of the present invention the rotary locking mechanism consists, on the one hand, of a locking piece securely connected in the circumferential direction and in the axial direction with the compressor shaft and, on the other, of a cylindrically shaped, rotary locking member coordinated from an assembly point of view to the compressor-drive-turbine-shaft and form-lockingly connected to the axial direction with the locking piece in the locked condition. which rotary locking member serves for the support of the compressor-drive-turbine-shaft in the axial direction, of a locking sleeve fixing the rotary locking member in the circumferential direction with respect to the compressor-drive-turbine-shaft, of radially directed locking bolts or like means rigidly secured in the compressor-drive-turbine-shaft and distributed over the circumference thereof which in turn fix the locking sleeve with respect to the compressor-drive-turbine-shaft in the circumferential direction as well as of an assembly key or wrench adapted to be inserted from the turbine side and adapted to be coupled with the locking sleeve in the circumferential direction for the actuation of the rotary locking mechanism, whereby with a gas turbine drive unit having an output or load turbine the output shaft thereof serves simultaneously as assembly key or wrench.

The present invention makes it possible with the elimination of the disadvantages encountered with the prior art construction to realize in the simplest manner the assembly and disassembly of the completed turbine rotor or of the two turbine rotors by merely a short withdrawal and thereupon short rotation of the output turbine together with its shaft or a part equivalent thereof to be used as actuating key.

Accordingly, it is an object of the present invention to provide a coupling between the compressor-drive-turbine-shaft and the compressor-shaft of gas turbine drive units which eliminates by extremely simple means all of the aforementioned shortcomings and drawbacks encountered with the prior art constructions.

It is another object of the present invention to provide a coupling between the compressor-drive-turbine-shaft and the compressor-shaft of gas turbine drive units which greatly facilitates assembly and disassembly thereof, permits such assembly and disassembly from the turbine side thereof and dispenses with expensive and complicated parts for the assembly and disassembly.

A further object of the present invention resides in a coupling between the compressor-drive-turbine-shaft and the compressor shaft of a gas turbine drive unit which permits speedy assembly and disassembly of the coupling together with extensive preassembly of a large number of parts thereof outside of the turbine unit.

Still another object of the present invention resides in a coupling between the compressor-drive-turbine-shaft and the compressor-shaft of a gas turbine drive unit which is relatively insensitive to any angular offsets and/or displacements of the two shafts, requires no bulky and heavy connecting pieces, and eliminates the disadvantages customarily encountered inherently with threaded connections exposed to large fluctuations in temperature.

Still a further object of the present invention resides in a coupling for use between the compressor-drive-turbine-shaft and the compressor-shaft of gas turbine drive units which, by operationally reliable means transmits completely satisfactorily both the torque and the axial thrusts occurring within the unit notwithstanding the high temperatures and pressures that may occur therein.

Another object of the present invention resides in a coupling of the type described above which leaves great freedom in the accommodation of lines, pipes and the like for the conduction of operating media used in the gas turbine within the space present within the hollow shafts.

These and further objects, features and advantages of the present invention will become more obvious from the following description when taken in connection with the accompanying drawing which shows, for purposes of illustration only, one embodiment in accordance with the present invention, and wherein:

FIGURE 2 is a partial schematic cross-sectional view, on an enlarged scale, of certain details of the locking mechanism of FIGURE 1, taken along line II—II of FIGURE 1, the parts being shown in the locked condition thereof, unfolded or unwound in the circumferential direction, and FIGURE 3 is a partial schematic view, similar to FIGURE 2, showing the same parts in the unlocked condition thereof.

Figure 1:
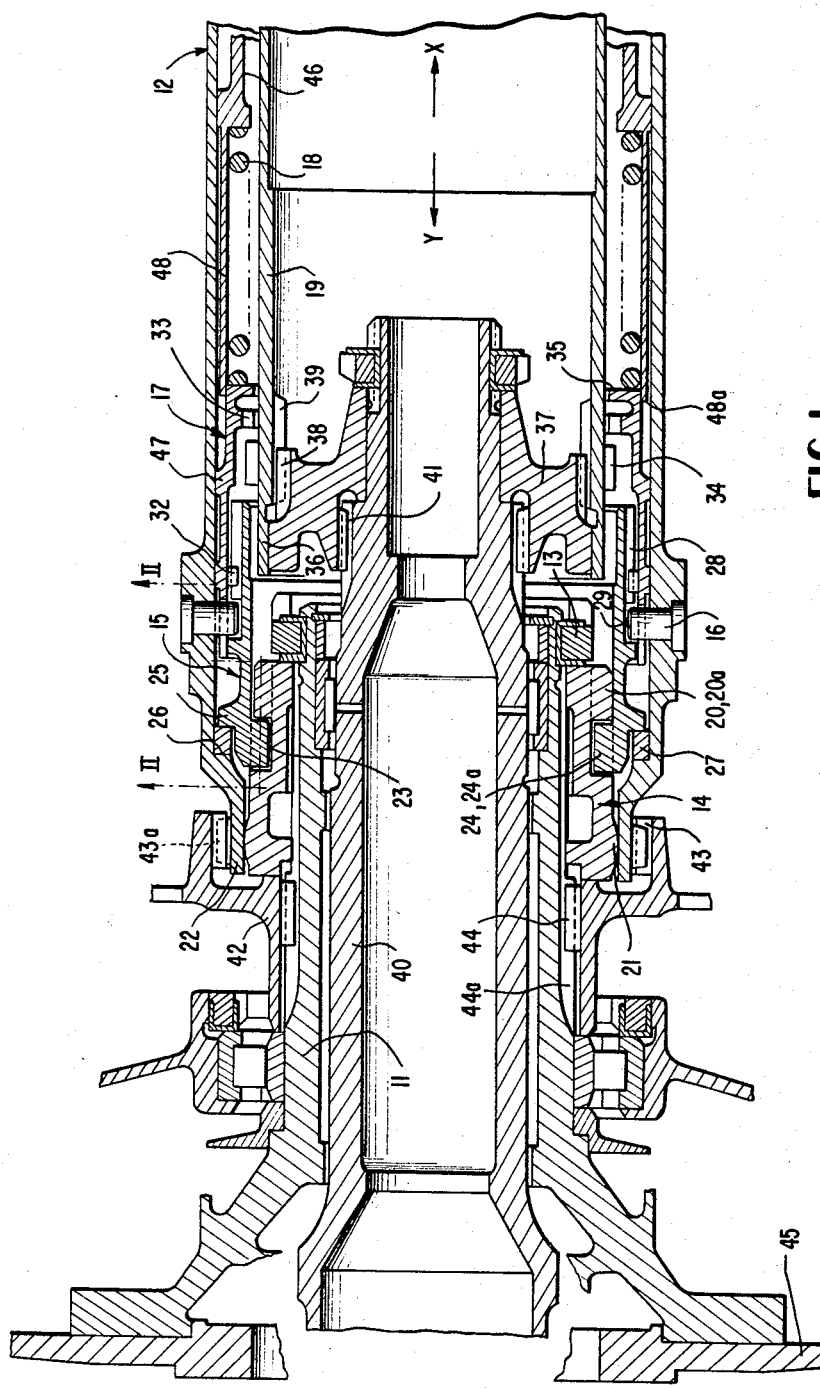
FIGURE 1 is a partial axial longitudinal cross-sectional view through a gas turbine drive unit within the area of the coupling between the compressor-shaft and the compressor-drive-turbine-shaft as well as the output shaft.

Referring now to the drawing wherein like reference numerals are used throughout the various views designate like parts, reference numeral 11 designates the compressor shaft and reference numeral 12 generally designates the compressor-drive-turbine-shaft. The coupling for the form-locking connection of the compressor shaft 11 with the compressor-drive-turbine-shaft 12 in the axial direction (X, Y) is constructed according to the present invention as rotary locking mechanism. The latter essentially consists, on the one hand, of a locking piece generally designated by reference numeral 14 securely connected with the compressor shaft 11 by a threaded connecting means 13 and, on the other, of the following parts coordinated from an assembly point of view to the compressor-drive-turbine-shaft 12: A rotary locking member generally designated by reference numeral 15, several locking bolts 16 which distributed over the circumference are securely arranged in the compressor-drive-turbine-shaft 12 and project radially inwardly, a locking sleeve 17, a spring 18 prestressing the sleeve 17 in the direction of the arrow Y and finally an assembled key or wrench which, with a gas turbine drive unit having a free output or load turbine and a forwardly extending output shaft 19, is constituted by the latter.

The locking piece 14 is provided at its rear end with teeth 20 whereas the forward end is constructed as spherical centering means 21, on which is centered the forward end 22 of the compressor-drive-turbine-shaft 12, which is supported thereon to be angularly moveable within small limits. An annular groove 23 extending continuously in the circumferential direction is provided in the locking piece 14 directly in front of the teeth 20.

The forward end of the rotary locking member 15 is constructed as toothed element 24 which has the same division or pitch as the teeth 20. Rearwardly of the teeth 24 there is provided at the locking member 15 a radially outwardly directed collar 25, against which is supported in the axial direction X the compressor-drive-turbine-shaft 12 by way of a shoulder 26 and a pressure or thrust ring 27. The locking member 15 is provided at the rear end thereof with teeth 28 and in front of these teeth 28, with individual guide grooves 29 having a length $l$ in the circumferential direction (FIGURE 3) which are distributed over the circumference and correspond in their number to the number of the locking bolts 16. The length $l$ of the guide grooves 29 corresponds to the division or pitch of the teeth 20 and 24 plus the diameter of the locking bolts 16 which engage in these guide grooves 29 with slight play in the axial direction X and Y.

Apertures 30 (FIGURES 2 and 3) are provided forwardly at the locking sleeve 17 so that the latter is constructed thereat in a fork-like manner and is provided with individual fingers 31 which extend about and engage the locking bolts 16 in the circumferential direction A, Z in a form-locking manner whereby the locking sleeve 17 is fixed in the circumferential direction A, Z with respect to the compressor-drive-turbine-shaft 12. Furthermore, internal teeth 32 are provided at the locking sleeve 17 which engage with the external teeth 28 of the rotary locking member 15. The rotary locking member 15 has a greater length than the length $f$ of the apertures 30. Additional internal teeth 33 are arranged within the rearward area of the locking sleeve 17 with which external teeth 34 provided at the forward end of the output shaft 19 can be brought into temporary engagement for the purpose of locking and unlocking of the coupling mechanism. The rear end of the locking sleeve 17 is constructed as ring-shaped abutment 35 which serves for the withdrawal of the locking sleeve 17 by means of the external teeth 34 during the locking and unlocking of the mechanism.

The forward end 36 of the output shaft 19 is centered on a coupling piece 37 which is provided with external teeth 38 with which engage the internal teeth 39 of the output shaft 19. The coupling piece 37 is secured on the rear end of a shaft 40 and is non-rotatably connected with the shaft 40 by way of entrainment or spline teeth 41. The shaft 40 extends forwardly through the hollow compressor-shaft 11 to a conventional speed-reduction gear for the propeller drive.

The torque transmission from the compressor-drive-turbine-shaft 12 to the compressor shaft 11 takes place by way of a coupling piece 42 having internal teeth 43 and 44 which engage with corresponding external teeth 43a and 44a of the compressor-drive-turbine-shaft 12 and the compressor shaft 11, respectively.

The last compressor section or stage which is shown only in part, is indicated in FIGURE 1 by reference numeral 45. The support of the spring 18 toward the rear takes place by means of a bushing 46 which is securely connected at the rear thereof by any conventional known means with the compressor-drive-turbines (not shown) and is taken along by the latter in the circumferential direction.

*Operation*

The handling and operation of the coupling and rotary locking mechanism of the present invention are as follows:

FIGURES 1 and 2 illustrate the mechanism in the locked condition. For purposes of unlocking the mechanism, the output shaft 19 is withdrawn or pulled back in the direction of arrow X whereby the external teeth 34 are brought into engagement with the internal teeth 33 of the locking sleeve 17 which at the same time is taken back by way of the annularly shaped abutment 35 by means of the external teeth 34 of the output shaft 19 for such a distance until the fingers 31 at the forward end of the locking sleeve 17 come to lie behind the locking bolts 16. The withdrawing or retraction of the output shaft 19 and of the locking sleeve 17 is limited by an abutment collar 47 provided thereon which abuts against the forward edge 48a of a spacer bushing or sleeve 48 which is arranged in front of the support sleeve 46 and may be in one piece with the latter. In the retracted position, in which the internal teeth 39 of the output shaft 19 are disengaged from the external teeth 38 of the coupling piece 37, takes place the unlocking operation, properly speaking, by rotation of the output shaft 19 in the circumferential direction Z while taking along the locking sleeve 17 by way of the teeth 34 and 33 and of the locking member 15 by way of the teeth 32 and 28, and more particularly to such an extent until the position illustrated in FIGURE 3 is reached, i.e., until the edges 29a of the guide grooves 29 laterally abut against the locking bolts 16. In this position, the teeth 24a of the tooth system 24 of the locking member 15 are disposed opposite the gaps of the teeth 20a of the tooth system 20 of the locking piece 14. This position (unlocked position) of the rotary locking member 15 with respect to the locking piece 14 is then fixed again by the automatic forward movement in the direction Y of the locking sleeve 17 with the aid of the spring 18 relative to the output shaft 19 by means of the fingers 31 and the locking bolts 16 so that now the compressor-drive-turbine-shaft 12 together with the locking sleeve 17, the spring 18, the sleeves 46, 48 and the rotary locking member 15 can be pulled off from the locking piece 14 in the direction of arrow X, i.e., can be separated from the compressor shaft 11 and the coupling piece 42.

During assembly of the drive unit, the compressor drive turbines and the output turbines are preassembled with the compressor-drive-turbine-shaft 12 and the output shaft 19 as well as with the parts 27, 15, 16, 17, 18, 46 and 48 outside of the drive unit. Then all of the aforementioned parts are introduced, preassembled, into the drive unit in the direction of arrow Y whereby the forward end 22 of the compressor-drive-tubine-shaft 12 is initially coupled in the circumferential direction with the compressor-shaft 11 and the coupling piece 42 by means of the entrainment teeth 42, 43a and simultaneously the teeth 24a of the rotary locking member 15 are brought through the gaps 20b of the locking piece 14 into the position illustrated in FIGURE 3. In order to enable this operation, the locking piece 14 is secured or fixed on the compressor shaft 11 in the circumferential direction in such a manner that its tooth gaps 20b are aligned with the tooth gaps of the internal teeth 43 of the coupling piece 42. For purposes of locking the coupling mechanism, i.e., in order to establish also the form-locking connection of the two shafts 11 and 12 in the axial direction Y, X, the output shaft 19 is again retracted at first relative to the compression-drive-turbine-shaft 12, taking along the locking sleeve 17, in the direction of the arrow X for such a distance until the abutment collar 47 thereof abuts against the forward edge 48a of the abutment sleeve 48. Thereupon the locking, properly speaking, takes place by rotation of the output shaft 19 in the circumferential direction, and more particularly in the direction of arrow A while taking along the locking sleeve 17 and the rotary locking member 15 into the position illustrated in FIGURE 2 in which the teeth 24a and the teeth 20a are in alignment. This position of the rotary locking member 15 is finally fixed by forward movement of the locking sleeve 17 with the aid of the spring 18 and by the fingers 31 which form-lockingly engage about the locking bolts 16, with respect to the compressor-drive-turbine-shaft 12 which again is fixed by way of the coupling piece 42 and the entrainment teeth 43, 43a and 44, 44a, with respect to compressor shaft 11. In the locked position of the mechanism the external teeth 34 of the output shaft 19 are out of engagement with the internal teeth 33 of of the locking sleeve 17 so that the compressor-drive-turbineshaft 12 and the output-shaft 19 can rotate at different rotary speeds.

While several embodiments have been shown and described in the present application, it is understood that the same is not limited thereto but is susceptible of numerous changes and modifications as known to a person skilled in the art and the present invention is therefore not to be construed as limited to the details shown and described herein but encompasses all such changes and modifications as are encompassed by the scope of the appended claims.

What is claimed is:

1. A coupling, especially for use in gas turbine drive units having a compressor and a compressor-drive-turbine, each having shafts therein, and a combustion chamber located between the compressor and the compressor-drive-turbine, for releasably engaging the compressor-drive-turbine shaft and the compressor-shaft of gas turbine drive units, comprising means for aligning said two shafts with respect to each other while permitting angular movements thereof within slight limits, and coupling means form-lockingly connecting said two shafts with each other for the transmission of the driving torque in the circumferential direction and for the absorption of the thrust in the axial direction, including rotary locking means remotely actuatable from the turbine side, whereby said two shafts may be engaged or disengaged with one another without disassembling the combustion chamber.

2. A coupling according to claim 1, wherein the gas turbine drive unit further includes output turbine means mechanically separate from the compressor drive turbine means and an output shaft driven by said output turbine means and extending forwardly within and substantially coaxially to the compressor drive turbine shaft, said rotary locking means including a plurality of movable parts and actuating means for actuating the movable parts thereof, said output shaft serving as said actuating means.

3. A coupling according to claim 2, wherein said rotary locking means comprises, on the one hand, locking piece means operatively connected with the compressor shaft in the circumferential as well as in the axial direction and, on the other, substantially cylindrically shaped rotary locking means coordinated from an assembly point of view to the compressor-drive-turbine-shaft and form-lockingly connected in the locked condition with the locking piece means in the axial direction, locking sleeve means fixing the rotary locking means in the circumferential direction with respect to the compressor-drive-turbine-shaft radially directed locking bolt means rigidly secured in the compressor-drive-turbine-shaft and distributed over the circumference thereof for fixing the locking sleeve means in the circumferential direction with respect to the compressor-drive-turbine-shaft, and actuating key means adapted to be inserted from the turbine side and adapted to be coupled in the circumferential direction with the locking sleeve means for the actuation of the rotary locking means.

4. A coupling according to claim 3, wherein the output shaft simultaneously serves as assembly key means.

5. A coupling according to claim 4, wherein said locking piece means, which is securely connected with the compressor shaft in the axial and in the circumferential direction, is provided with a continuous annular groove means in the circumferential direction and with tooth means disposed rearwardly of the groove means in the direction toward turbine.

6. A coupling according to claim 5, wherein said rotary locking means is provided forwardly thereof with tooth means having a pitch corresponding to the pitch of the tooth means of the locking piece means and engaging in the locked condition of the coupling into said annular groove means in front of the tooth means of the locking piece means with the individual teeth of said two tooth means being in alignment in the axial direction, said rotary locking means further including a radially outwardly directed abutment collar effective in the axial direction for the compressor-drive-turbine-shaft and being provided at the rear end thereof with external tooth means and with individual guide grooves corresponding in number to the locking bolt means, said guide grooves being effective as abutment for the locking bolt means in the circumferential direction, each guide groove extending in the circumferential direction with a length corresponding to the pitch of the external tooth means plus the diameter of a locking bolt means, said locking bolt means engaging in said guide grooves, and the width of said guide grooves in the axial direction being larger than the diameter of the locking bolt means by an amount necessary for the movement play.

7. A coupling according to claim 6, wherein apertures are provided at the forward end of the locking sleeve means whose width in the circumferential direction substantially corresponds to the diameter of the locking bolt means, said locking bolt means being form-lockingly engaged by the fingers of the forward end of the locking sleeve means which are formed by said apertures, the locking sleeve means being provided to the rear of said apertures with internal tooth means engaging into the external tooth means engaging into the external tooth means of the rotary locking means, and further internal tooth means arranged at the rear end of the locking sleeve means with which is brought into engagement only during the locking and unlocking operation the external tooth means provided at the forward end of the actuating key means.

8. A coupling according to claim 7, wherein the external tooth means provided at the rear end of the rotary locking means have a greater axial length than the axial length of the apertures provided at the forward end of the locking sleeve means.

9. A coupling according to claim 8, further comprising spring means supported securely in the axial direction toward the turbine, said locking sleeve means being under prestress by said spring means in the axial direction.

10. A coupling according to claim 9, wherein said locking sleeve means is provided at the rear end thereof rearwardly of the internal tooth means with an annularly shaped abutment means, said locking sleeve means being temporarily retracted by way of said abutment means by means of the external tooth means of the output shaft for the locking and unlocking of the locking mechanism.

11. A coupling according to claim 10, further comprising a coupling piece for centering the forward end of the output shaft, the forward end of said output shaft being provided with internal tooth means engaging with external tooth means provided on said coupling piece, a forwardly extending shaft for the drive of a propeller speed reduction gear, and means securely connecting the coupling piece with said last-mentioned shaft.

12. A coupling according to claim 11, wherein the internal tooth means of the output shaft are brought out of engagement with the external teeth of said coupling piece during the locking and unlocking operations with said output shaft in the retracted position.

13. A coupling according to claim 12, wherein said locking sleeve means is centered within the compressor-drive-turbine-shaft.

14. A coupling according to claim 13, further comprising support sleeve means fixed on the turbine side, the rear end of said spring means resting against said support sleeve means, a forwardly extending abutment sleeve disposed in front of said support sleeve means, the forward end of said abutment sleeve serving as abutment in the axial direction for the locking sleeve means, and said locking sleeve means being provided with an abutment collar to engage with the forward end of the abutment sleeve.

15. A coupling according to claim 14, wherein the forward portion of the coupling piece means is constructed as spherically shaped centering means for the angularly moveable support of forward end of the compressor-drive-turbine-shaft.

16. A coupling according to claim 15, further comprising a coupling element between said compressor shaft and said compressor-drive-turbine-shaft, said coupling piece means being fixed on the compressor shaft in the circumferential direction in such a matter that the tooth gaps thereof are in alignment with the tooth gaps of the internal tooth means of the coupling element which is securely mounted on the compressor shaft.

17. A coupling according to claim 16, wherein entrainment tooth means are provided at the forward end of the compressor-drive-turbine-shaft at the height of the centering means between said coupling element and the compressor drive turbine shaft.

18. A coupling according to claim 17, wherein the compressor-drive-turbine-shaft, the output-shaft and the moveable parts of said rotary locking means are preassembled outside of the drive unit.

19. A coupling according to claim 1, wherein said rotary locking means comprises, on the one hand, locking piece means operatively connected with the compressor shaft in the circumferential as well as in the axial direction and, on the other, substantially cylindrically shaped rotary locking means coordinated from an assembly point of view to the compressor-drive-turbine-shaft and form-lockingly connected in the locked condition with the locking piece means in the axial direction, locking sleeve means fixing the rotary locking means in the circumferential direction with respect to the compressor-drive-turbine-shaft, radially directed locking bolt means rigidly secured in the compressor-drive-turbine-shaft and distributed over the circumference thereof for fixing the locking sleeve means in the circumferential direction with respect to the compressor-drive-turbine-shaft, and actuating key means adapted to be inserted from the turbine side and adapted to be coupled in the circumferential direction with the locking sleeve means for the actuation of the rotary locking means.

20. A coupling according to claim 19, wherein said locking piece means, which is securely connected with the compressor shaft in the axial and in the circumferential direction, is provided with a continuous annular groove means in the circumferential direction and with tooth means disposed rearwardly of the groove means in the direction toward turbine.

21. A coupling according to claim 20, wherein said rotary locking means is provided forwardly thereof with tooth means having a pitch corresponding to the pitch of the tooth means of the locking piece means and engaging in the locked condition of the coupling into said annular groove means in front of the tooth means of the locking piece means with the individual teeth of said two tooth means being in alignment in the axial direction, said rotary locking means further including a radially outwardly directed abutment collar effective in the axial direction for the compressor-drive-turbine-shaft and being provided at the rear end thereof with external tooth means and with individual guide grooves corresponding in number to the locking bolt means, said guide grooves being effective as abutment for the locking bolt means in the circumferential direction, each guide groove extending in the circumferential direction with a length corresponding to the pitch of the external tooth means plus the diameter of a locking bolt means, said locking bolt means engaging in said guide grooves, and the width of said guide grooves in the axial direction being larger than the diameter of the locking bolt means by an amount necessary for the movement play.

22. A coupling according to claim 21, wherein apertures are provided at the forward end of the locking sleeve means whose width in the circumferential direction substantially corresponds to the diameter of the locking bolt means, said locking bolt means being form-lockingly engaged by the fingers of the forward end of the locking sleeve means which are formed by said apertures, the locking sleeve means being provided to the rear of said apertures with internal tooth means engaging into the external tooth means of the rotary locking means, and further internal tooth means arranged at the rear end of the locking sleeve means with which is brought into engagement only during the locking and unlocking operation the external tooth means provided at the forward end of the actuating key means.

23. A coupling according to claim 22, wherein the external tooth means provided at the rear end of the rotary locking means have a greater axial length than the axial length of the apertures provided at the forward end of the locking sleeve means.

24. A coupling according to claim 23, further comprising spring means supported securely in the axial direction toward the turbine, said locking sleeve means being under prestress by said spring means in the axial direction.

25. A coupling according to claim 23, wherein said locking sleeve means is provided at the rear end thereof rearwardly of the internal tooth means with an annularly shaped abutment means, said locking sleeve means being temporarily retracted by way of said abutment means by means of external tooth means provided at said key means for the locking and unlocking of the locking mechanism.

26. A coupling according to claim 25, further comprising an output shaft forming a part of said actuating key means, a coupling piece for centering the forward end of the output shaft, the forward end of said output shaft being provided with internal tooth means engaging with external tooth means provided on said coupling piece, a forwardly extending shaft for the drive of a propeller speed reduction gear, and means securely connecting the coupling piece with said last-mentioned shaft.

27. A coupling according to claim 26, wherein the internal tooth means of the output shaft are brought out of engagement with the external teeth of said coupling piece during the locking and unlocking operations with said output shaft in the retracted position.

28. A coupling according to claim 19, wherein said locking sleeve means is centered within the compressor-drive-turbine-shaft.

29. A coupling according to claim 19, further comprising spring means supported securely in the axial direction toward the turbine, said locking sleeve means being under prestress by said spring means in the axial direction.

30. A coupling according to claim 29, further comprising support sleeve means fixed on the turbine side, the rear end of said spring means resting against said support sleeve means, a forwardly extending abutment sleeve disposed in front of said support sleeve means, the forward end of said abutment sleeve serving as abutment in the axial direction for the locking sleeve means, and said locking sleeve means being provided with an abutment collar to engage with the forward end of the abutment sleeve.

31. A coupling according to claim 19, wherein the forward portion of the coupling piece means is constructed as spherically shaped centering means for the angularly moveable support of forward end of the compressor-drive-turbine-shaft.

32. A coupling according to claim 19, further comprising a coupling element between said compressor shaft and said compressor-drive-turbine-shaft, said coupling piece means being fixed on the compressor shaft in the circumferential direction in such a manner that the tooth gaps thereof are in alignment with the tooth gaps of the internal tooth means of the coupling element which is securely mounted on the compressor shaft.

33. A coupling according to claim 32, wherein entrainment tooth means are provided at the forward end of the compressor-drive-turbine-shaft at the height of the centering means between said coupling element and the compressor drive turbine shaft.

34. A coupling according to claim 2, wherein the compressor-drive-turbine-shaft, the output-shaft and the moveable parts of said rotary locking means are pre-assembled outside of the drive unit.

References Cited

UNITED STATES PATENTS

| | | | |
|---|---|---|---|
| 2,525,695 | 10/1950 | Lombard | 64—9 |
| 2,712,740 | 7/1955 | Boyd | 64—9 |
| 2,744,395 | 5/1956 | Massey et al. | 64—9 |
| 2,785,550 | 3/1957 | Petrie | 64—9 |
| 2,836,041 | 5/1958 | Petrie | 64—9 |
| 2,864,244 | 12/1958 | Prachar | 64—9 |

FOREIGN PATENTS 770,683   3/1957   Great Britain.

HALL C. COE, *Primary Examiner.*